United States Patent [19]
La Charite

[11] 3,967,834
[45] July 6, 1976

[54] MOTORCYCLE LIFTING DEVICE

[75] Inventor: George J. La Charite, Clawson, Mich.

[73] Assignees: Rolland G. C. La Charite, Santa Ana, Calif.; Gene V. Rowley, Clawson, Mich. ; part interest to each

[22] Filed: Nov. 29, 1974

[21] Appl. No.: 527,940

[52] U.S. Cl.............................. 280/291; 280/289 R
[51] Int. Cl.².................. B62J 25/00; B62J 39/00
[58] Field of Search........... 280/289, 291, 295, 301, 280/303; 180/30; 74/560, 564; 16/125, 110 R

[56] References Cited
UNITED STATES PATENTS

| 993,567 | 5/1911 | Stickelbaut | 280/291 |
|---|---|---|---|
| 2,339,646 | 1/1944 | Mann | 16/125 X |
| 2,394,248 | 2/1946 | McCray | 16/125 |
| 2,835,508 | 5/1958 | Wood et al. | 280/301 |
| 2,908,510 | 10/1959 | Lossau | 280/303 X |
| 3,362,726 | 1/1968 | Bell | 180/30 X |
| 3,554,311 | 1/1971 | Thompson et al. | 280/295 |

FOREIGN PATENTS OR APPLICATIONS

| 559,493 | 2/1930 | Germany | 280/291 |
|---|---|---|---|
| 549,804 | 10/1956 | Italy | 280/291 |
| 207,291 | 3/1940 | Switzerland | 280/291 |

*Primary Examiner*—Kenneth H. Betts
*Attorney, Agent, or Firm*—Harness, Dickey & Pierce

[57] ABSTRACT

A lifting device for a motorcycle or similar type of two-wheeled vehicle having a frame and retractable vehicle standard, the device comprising a pair of manually engageable handles located on the laterally opposite sides of the motorcycle frame at a position below the seating area for the vehicle operator, with the handles being pivotably movable between a position extending generally parallel to the frame and a position extending laterally outwardly therefrom. In one embodiment of the invention, the handles are combined with foot pedals for the passenger on the associated motorcycle.

5 Claims, 7 Drawing Figures

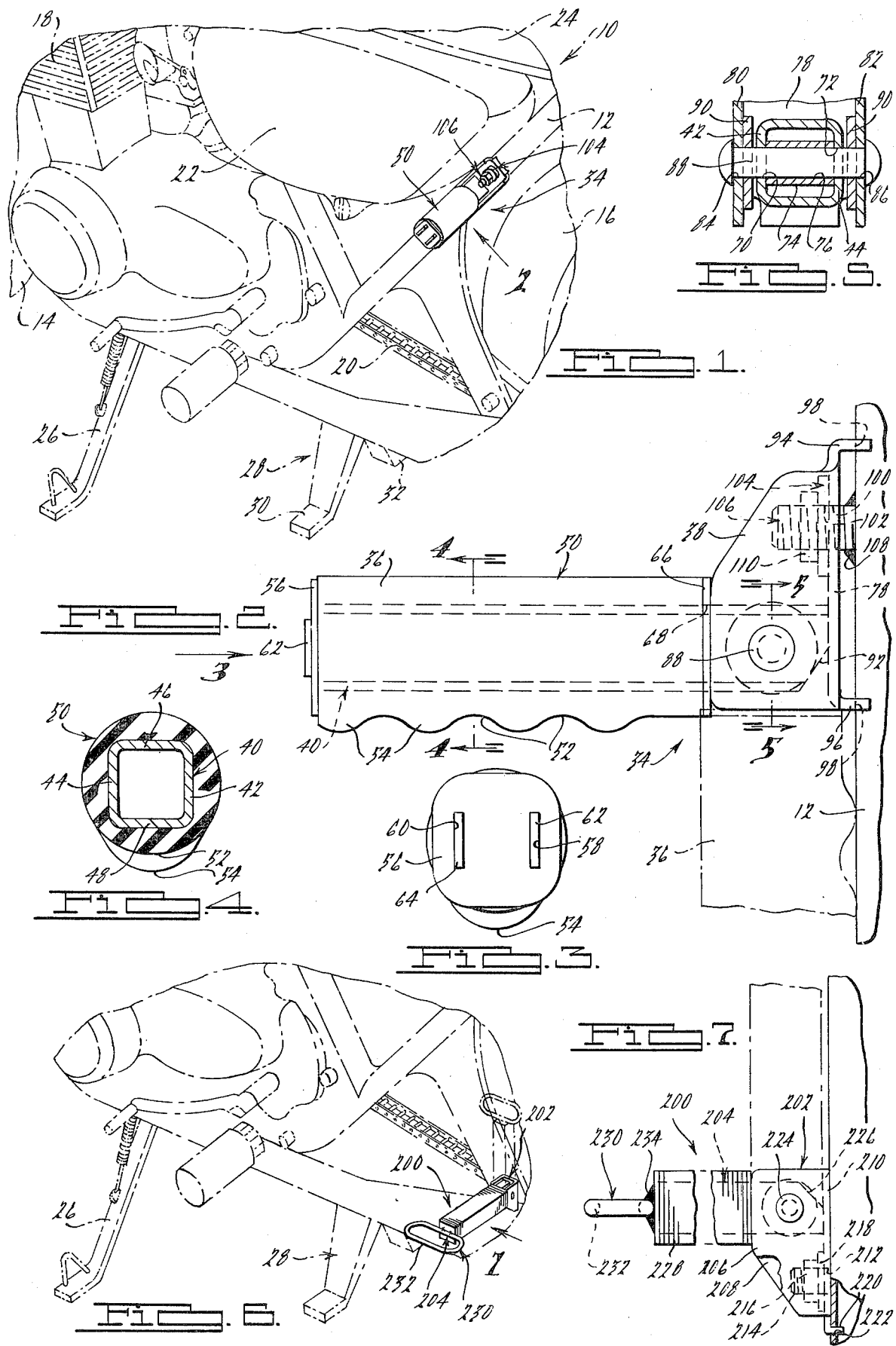

MOTORCYCLE LIFTING DEVICE

BACKGROUND OF THE INVENTION

Although the use of motorcycles and similar type two-wheel motor operated vehicles continues to increase in popularity, both from a recreational standpoint and as a means of providing reliable day to day transportation, modern motorcycles have been subject to one objectionable criticism which resides in the difficulty in placing the motorcycle upon their center or central standard during periods of non-use and/or repair or inspection. More particularly, and as will be appreciated by those skilled in the art, motorcycles are provided with a centrally mounted standard that is normally retained in a retracted position but which may be lowered in order to support the motorcycle in a generally vertical or upright position with the rear wheel thereof elevated off from the adjacent terrain or raod surface. It has heretofore been the practice to place the motorcycle on the central stand by rocking the motorcycle rearwardly and at the same time lowering the stand from its retracted position to its extended position, thereby forcing the motorcycle longitudinally rearwardly onto the standard. Unfortunately, the effort required to effect such mounting of the motorcycle upon the stand, particularly in the case of relatively large motorcycles, requires considerable effort and it is thus quite difficult for a motorcycle operator to perform this operation, especially in the case where the operator may be elderly or not have sufficient strength to perform this operation.

The present invention is generally directed to a new and improved means of overcoming the aforementioned objectionable criticism of motorcycles, and specifically is directed to a new and improved motorcycle lifting means or device by which the vehicle operator can apply an upwardly directed force to the motorcycle and thereby significantly reduce the effort heretofore required to place the motorcycle upon the central stand thereof. More particularly, the present invention is directed to a new and improved arrangement by which a motorcycle may be provided with a pair of retractable manually graspable or engageable handles located in a convenient location below the seating area of the vehicle. The handles are normally disposed in a retracted position, but are movable to a generally outwardly projecting position when they are being used to effect lifting of the motorcycle. In an alternative embodiment of the present invention, the handles are combined with retractable pedals or foot-rests frequently provided on motorcycles as an aid for the motorcycle passengers and which are normally disposed in a retractable position but which may be extended during use. A particular feature of the present invention resides in the fact that the lift facilitating devices are provided with a means for yieldably retaining the same in their extended and retracted positions, whereby to assure against undesirable movement of the handles between such positions during normal operation of the motorcycle. Another feature of the present invention resides in the fact that the lift devices are of an extremely simple design and hence may be economically manufactured and will have a long effective operational life, as will hereinafter be described in detail.

SUMMARY OF THE INVENTION

This invention relates generally to motorcycles and similar two-wheeled vehicles, and more particularly, to a new and improved means for facilitating placing a motorcycle onto its central stand during periods of non-use.

It is accordingly a general object of the present invention to provide a new and improved means for facilitating lifting of a portion of a motorcycle onto the motorcycle stand.

It is a more particular object of the present invention to provide a new and improved lifting device consisting of a pair of retractable handles arranged on the opposite sides of the motorcycle at a position below the vehicle operator.

It is another object of the present invention to provide a new and improved device for facilitating lifting a motorcycle onto its associated stand which may be moved between retracted and outwardly extending positions.

It is a further object of the present invention to provide a new and improved motorcycle lifting device of the above described type which may be combined with a motorcycle passenger foot-rest.

It is still a further object of the present invention to provide a new and improved motorcycle lifting device, as above described, which may be economically manufactured, will have a long and effective operational life and may be provided in the form of original equipment on a motorcycle or as an after-market optional accessory item.

Other objects and advantages of the present invention will comparatively follow a detailed description further in conjunction with the accompanying drawings.

BRIEF DESCRIPTION OF THE DRAWINGS

FIG. 1 is an elevated perspective view of a portion of a typical motorcycle vehicle depicted in phantom lines and shows one of the motorcycle lift devices of the present invention;

FIG. 2 is a side elevational view of the motorcycle lift device shown in FIG. 1;

FIG. 3 is an end elevational view of the structure shown in FIG. 2, as taken in the direction of the arrow 3 thereof;

FIG. 4 is a transverse cross-sectional view taken substantially along the line 4—4 of FIG. 2;

FIG. 5 is another transverse cross-sectional view taken substantially along the line 5—5 of FIG. 2;

FIG. 6 is a view similar to FIG. 1 illustrating an alternate embodiment of the present invention; and FIG. 7 is a fragmentary side elevational view of the embodiment of the present invention shown in FIG. 6.

DESCRIPTION OF THE PREFERRED EMBODIMENT

Referring now in detail to the drawing and in particular to FIG. 1 thereof, a fragmentary portion of a typical motorcycle 10 is shown as comprising a conventional tubular frame 12 adapted to operatively support front and rear wheels 14 and 16, respectively, the latter of which is power operated by means of a suitable motorcycle engine 18 that is drivingly connected to the rear wheel 16 via a suitable drive chain 20. As is conventional in the art, the motorcycle 10 is provided with a fuel tank 22 located forwardly of the operator and passenger seating area 24. The motorcycle 10 is shown as being provided with a retractable side stand or standard 26 and with a central stand 28, the latter of which is also retractable and functions to support the rearward end of the motorcycle 10 in an elevated position when the stand 28 is in an extended position, whereby to provide stable support of the motorcycle 10 for purposes of storage, inspection, repair and the like. As previously mentioned, due to the large mass of certain types of motorcycles 10 and similar type vehicles, it is necessary to perform a forward and rearward rocking operation in order to get the rearward end of the motorcycle 10 onto the central stand 28 which, as best seen in FIG. 1, is shown as comprising a pair of downwardly extending support legs 30 and 32 that have their upper ends pivotably secured to the motorcycle frame 12 and have their lower ends adapted for engagement with the ground or other terrain located below the motorcycle 10.

In accordance with the principles of the present invention, the motorcycle 10 is provided with a new and improved lifting means by which the operator may supply an upwardly directed force to the motorcycle frame at the same time as the central stand 28 is being lowered, whereby to greatly facilitate placing the motorcycle 10 onto the stand 28. The lifting device of the present invention is provided in the form of a pair of lifting handles, generally designated by the numeral 34, which are located on the laterally opposite sides of the motorcycle 10 and are fixedly secured to the frame 12 thereof in a manner hereinafter to be described. By virtue of the fact that the handle devices 34 provided on the motorcycle 10 are identical in construction and operation, only a single of the device will be described in detail for purposes of clarity and conciseness of description.

Referring now to FIG. 2, the device(s) 34 comprise a handle section 36 that is cantilever supported by means of a mounting bracket, generally designated by the numeral 38. The section 36 consists of a generally square tubular member 40 fabricated of a suitable high strength material such as carbon steel, and comprising spaced parallel side sections 42, 44, between which top and bottom sections 46, 48 extend. Telescopically received on the outer end of the member 40 is a sleeve-like member, generally designated by the numeral 50, which is preferably fabricated by the resilient deformed material, such as natural or synthetic rubber. The member 50 is generally circular in cross section and is provided with a square cross section bore within which the member 40 is received. The underside of the sleeve-like member 50, as shown in FIG. 3, is formed with a plurality of longitudinally alternately disposed arcuate recesses and protruding portions 52 and 54, respectively, which facilitate manual grasping of the handle section 36.

The sleeve-like member 50 is retained from sliding axially or longitudinally off from the member 40 by means of a retaining plate 56 which is secured on the outer end of the member 40 and extends outwardly from the outer periphery thereof. The retaining plate 56 is formed with a pair of laterally spaced openings 58, 60 through which a pair of outwardly extending tab portions 62 and 64 formed on the side sections 42, 44 of the member 40 project, the tab portions 62, 64 being deformed or otherwise swaged so as to operatively secure the retaining plate 56 and hence the sleeve-like member 50 upon the member 40. Disposed at the opposite end of the member 50 from the retaining plate 56 is a bearing plate, generally designated by the numeral 66. The plate 66 is formed with a square opening 68 which is of the same general size and shape as the outer periphery of the member 40 and is adapted to have the member 40 extend therethrough.

As best seen in FIG. 5, the side sections 42, 44 of the member 40 are formed by a pair of laterally aligned openings 70, 72, respectively, through which a suitable sleeve or collar 74 extends, the member 74 defining a bore 76 which extends the entire lateral distance through the member 40, as illustrated, and through which a pivot element, hereinafter to be described, extends, whereby the handle section 36 may be pivotably moved between the phantom line position shown in FIG. 2 and a solid line position shown in this figure. The bearing plate 66 is adapted to ride or bear against the mounting bracket 38 in a manner hereinafter to be described and coacts with the sleeve-like member 50 in positively retaining the handle section 36 and its respective positions shown in FIG. 2.

Referring now in detail to the construction of the mounting bracket 38, as best seen in FIGS. 2 and 5, the bracket 38 is generally U-shaped in transverse cross-section and includes a central section 78 and a pair of laterally outwardly extending spaced parallel side sections 80, 82 which are spaced apart a distance approximately equal to the transverse thickness of the member 40. The side sections 80, 82 are formed with a pair of laterally aligned openings 84, 86 which, upon assembly of the member 40 with the bracket 80, are adapted to be laterally aligned with the bore 76, whereby a suitable pivot pin or shaft 88 may be inserted through the openings 84, 86 and bore 76 to pivotably secure the member 40 to the bracket 38. The opposite ends of the pivot pin or shaft 88 may be provided with enlarged head sections or suitable cross bores and cotter pins may be used to retain the pivot pin in its operative position. In a preferred construction of the present invention, a pair of thrust washer elements 90 are provided adjacent the laterally inner sides of the side sections 80, 82 of the mounting bracket 38, the washers 90 being secured, as by spot-welding, to the bracket 38. As best seen in FIG. 2, the underside of the inner end of the member 40 is relieved or cut-away, as seen at 92 to enable the member 40 to be pivotally biased in an interference free manner between the phantom line position and the solid line position in this firure. It will be noted that the distance between the center of the openings 84, 86 and the central section 78 of the mounting bracket 38 is such that when the member 40 has been biased approximately 90 degrees from the phantom line position in FIG. 2 to the solid line position in this firure, the inner end of the member 40 will abut the inner side of the bracket section 78, thereby preventing further upward pivotal movement of the member 40 relative to the mounting bracket 38 so that an upwardly directed force may be applied to the handle section 36 without the outer end of the member 40 pivoting above the horizontal or 90 degree position shown in FIGS. 1 and 2.

The mounting bracket 38 is adapted to be operatively secured to the motorcycle frame 12 and in particular, to a portion of the frame 12 located below the area of the motorcycle seat 24 upon which the vehicle operator normally sits. Toward this end, the upper and lower ends of the central section 78 of the mounting bracket 38 are formed with outwardly directed mounting yoke portions 94 and 96 which are arranged at generally right angles to the plane of the central section 78 and extend outwardly therefrom in the opposite direction from the side sections 80, 82. The yoke sections 94, 96 are recessed or relieved in a manner so as to be complementary to the outer peripheral shape of the portion of the motorcycle frame 12 upon which the bracket 38 is to be secured. Preferably, the radius of the recesses 98 and the yoke sections 94, 96 is sufficiently large to accommodate varying sizes or cross-sectional shapes of the frame portions of different types and styles of motorcycle vehicles.

As best seen in FIG. 2, the central section 78 of the mounting bracket 38 is formed with an opening 100 which is aligned with a central opening or bore 102 in a washer 104 that is secured as by spot-welding or the like to the inner side of the central section 78. The openings 100, 102 are adapted to receive the other end of an externally threaded stud member 106 which is secured as by welding or the like, as seen at 108, to the portion of the frame 12 adjacent the mounting bracket 38. Means in the form of a suitable threaded nut or the like 110 is threadably received on the outer end of the stud 106 for fixedly securing the mounting bracket 38 and hence the handle section 36 to the frame portion 12.

In operation of the handle device 34, the handle sections 36 thereof are normally disposed in a generally vertical or downwardly extending position arranged substantially parallel to the adjacent portions of the frame 12, as seen by the phantom line position of the handle section 36 in FIG. 2. At such time as it is desired to place the rearward end of the motorcycle 10 upon the central stand 28 thereof, the handle sections 36 are pivoted laterally outwardly to the horizontal positions as shown in FIG. 1 and 2. In this position, the handle section 36 can be conveniently grasped by the motorcycle operator, whereby an upwardly directed force may be applied to the motorcycle frame 12 at the same time as the stand 28 is being lowered, thereby conveniently placing the motorcycle 10 upon the stand 28. At such time as the lifting operation has been completed, the handle sections 36 may be again pivoted from the solid line positions shown in FIG. 2 to the phantom line position, whereby the handle sections 36 are conveniently retracted to an out-of-the-way position. As previously mentioned, a particularly important feature of the present invention resides in the fact that as the handle sections 36 are biased between their lower retracted positions and their outwardly extended positions, the resilient members 50 will be axially compressed as the bearing plates 66 ride over the lower outwardly extending corners of the side sections 80, 82 of the mounting brackets 38. The length of the members 50 is designed such that the bearing plates 66 are resiliently urged into engagement with the lower ends of the side sections 80, 82 when the handle sections 36 are in their lower positions and the forward or front edges of the side sections 80, 82 and the handle sections 36 are disposed in their outwardly extended position shown in FIG. 2. Accordingly, the member 50 functions to retain the handle sections 36 in each of their retracted and extended positions and prevent inadvertent movement thereof between such positions.

Referring now to FIGS. 6 and 7, a modified construction of the present invention consists of a pair of lift devices, generally designated by the numeral 200, one of which is shown in FIGS. 6 and 7 and is hereinafter described in detail. The device(s) 200 is generally similar to the aforedescribed device 34 and as such includes a mounting bracket 202 adapted to pivotally support a member 204 which is analogous to the member 40. The mounting bracket 202 is similar to the aforedescribed mounting bracket 38 and includes a pair of spaced apart side sections 206, 208 which are connected to an integral central section 210. The central section 210 is formed with an opening 212 through which the outer end of an externally threaded stud member 214 extends, the opposite end of the stud 214 being secured as by welding to a suitable portion of the frame of the associated motorcycle. The stud 214 is provided with a suitable threaded nut or the like 216 and a suitable washer 218 is provided interjacent the nut 216 and section 210 of the bracket 202 in the same manner as the aforedescribed washer 104. The lower end of the mounting bracket 202 is provided with a rearwardly extending tab 220 which is adapted to be received within a suitable slot 222 of the adjacent portion of the frame of the associated motorcycle, with the tab 220 and stud 214 functioning to properly orient the mounting bracket 202 and hence the entire device 200 in its proper operative position upon the motorcycle. The inner end of the member 204 is adapted to be pivotably secured between the side sections 206, 208 of the mounting bracket 202 by means of a suitable pivot pin or the like 224 analogous to the aforedescribed pivot pin 88, with the upper side of the inner end of the member 204 being relieved or cut-away, as seen at 226, in order to provide for interference free pivotal movement of the member 204 between the phantom line and solid line positions in FIG. 7. The member 204 is provided with a resilient sleeve-like member 228 on the outer end thereof and the terminal end of the member 204 is provided with a manually engageable handle, generally designated by the numeral 230. As best seen in FIG. 6, the handle 230 is generally ovel-shaped and is provided with a manual grasping portion 232 which extends at generally right angles to the axis of the pivotal member 204, with the handle 230 being fixedly secured to the outer end of the member 204, as by welding shown at 234.

The devices 200 differ from the aforedescribed handle devices 34 in that the latter are adapted to function not only as a means for effecting lifting of the associated motorcycle onto its central stand, but also as a foot-rest or foot-pedal for a passenger who may be riding on the motorcycle. More particularly, the devices 200 are adapted to be secured to the frame of the associated vehicle at a position somewhat lower from the position at which the devices 34 are mounted. In this position, the pivotal members 201 may be normally stored or disposed in the phantom line upright position shown in FIG. 7, and at such time as a passenger riding on the motorcycle desires to rest his feet on the members 204, the same may be pivotally biased from the phantom line position to the laterally outwardly extended position shown in FIGS. 6 and 7. When it is desired to effect lifting of the motorcycle onto the central stand, the members 204 are pivotally biased to their respective upright or phantom line positions shown in FIG. 7, whereupon the handles 230 thereof are located at approximately the same position as the handle sections 36 of the devices 34. Accordingly, the vehicle operator may reach downwardly and grasp the portions 232 of the handles 230 and apply an upwardly directed force to the associated frame, whereupon the rearward end of the motorcycle may be lifted upwardly onto the stand. As with the handle sections 36, the members 204 are mounted by means of the aforedescribed pivot pin 224 within the mounting brackets 202 at a position wherein the inner ends of the members 204 abut against the interior of the mounting brackets 202 at such time as the members 204 have been pivoted from their stored or retracted upright positions to the outwardly extending horizontal positions shown in solid lines in FIG. 7. The sleeve-like member 228 provided on the members 204 functions in the same manner as the aforedescribed members 50 in yieldably retaining the members 204 in both their retracted positions and extended positions, whereby to preclude inadvertent movement of the members 204 therebetween.

It will be noted that while particular reference has been made herein to the use of the devices 34 and 200 on motorcycles, the present invention is not intended to be specifically so limited since application of the devices embodying the principles of the present invention can easily be foreseen on various other types of power operated vehicles, such as motorbikes, motorscooters and the like. Accordingly, the scope of the claims appended hereto is in no way intended to be limited to motorcycles per se.

While it will be apparent that the preferred embodiment illustrated herein is well calculated to fulfill the objects above stated, it will be appreciated that the present invention is susceptible to modification, variation and change without departing from the scope of the invention.

I claim:

1. In combination with a motorcycle or similar two-wheeled vehicle having a frame,
   a retractable vehicle standard and a seating area for the vehicle operator,
   a pair of substantially identical manually engageable handles secured to the opposite sides of the vehicle frame at positions adapted to be manually grasped by the vehicle operator for elevating the vehicle and thereby facilitating placing the vehicle on the standard,
   first and second mounting bracket means for supporting each of said handles for pivotal movement between a first downwardly projecting position arranged generally parallel to said frame and a second generally horizontal position extending laterally outwardly from said frame,
   a pair of pivot elements pivotally securing said handles to the associated of said mounting brackets,
   interengageable abutment means on said handles and said mouting brackets for preventing said handle from pivoting upwardly beyond said second position, and
   securing means including a threaded element fixedly attached to a portion of said frame adjacent to each of said handles for securing said mounting brackets thereto.

2. In combination with a motorcycle or similar two-wheeled vehicle having a frame,
   a retractable vehicle standard and a seating area for the vehicle operator,
   a pair of substantially identical manually engageable handles secured to the opposite sides of the vehicle frame at positions adapted to be manually grasped by the vehicle operator for elevating the vehicle and thereby facilitating placing the vehicle on the standard,
   first and second mounting bracket means for supporting each of said handles for pivotal movement between a first downwardly projecting position arranged generally parallel to said frame and a second generally horizontal position extending laterally outwardly from said frame,
   means cooperable with said handle for preventing said handle from pivoting upwardly beyond said said second position, and
   yieldable retaining means on said handles and cooperable with the associated of said mounting brackets for retaining said handles in said first and second positions.

3. In combination with a motorcycle or similar two-wheeled vehicle having a frame,
   a retractable vehicle standard and a seating area for the vehicle operator,
   a pair of substantially identical manually engageable handles secured to the opposite sides of the vehicle frame at positions adapted to be manually grasped by the vehicle operator for elevating the vehicle and thereby facilitating placing the vehicle on the standard,
   first and second mounting bracket means for supporting each of said handles for pivotal movement between a first downardly projecting position arranged generally parallel to said frame and a second generally horizontal position extending laterally outwardly from said frame,
   means cooperable with said handle for preventing said handle from pivoting upwardly beyond said second position, and
   yieldable retaining means on said handles and cooperable with the associated of said mounting brackets for retaining said handles in said first and second positions, said retaining means comprising a resilient sleeve mounted on each of said handles and cooperable with said mounting brackets.

4. In combination with a motorcycle or similar two-wheeled vehicle having a frame,
   a retractable vehicle standard and a seating area for the vehicle operator,
   a pair of substantially identical manually engageable handles secured to the opposite sides of the vehicle frame at positions adapted to be manually grasped by the vehicle operator for elevating the vehicle and thereby facilitating placing the vehicle on the standard,
   first and second mounting bracket means for supporting each of said handles for pivotal movement between a first downwardly projecting position arranged generally parallel to said frame and a second generally horizontal position extending laterally outwardly from said frame,
   means cooperable with said handle for preventing said handle from pivoting upwardly beyond said second position, and
   a pair of resilient sleeves mounted on each of said handles and serving as manually engageable hand grips and adapted to cooperate with the associated of said mounting brackets for retaining said handles in said first and second positions.

5. In combination with a motorcycle or similar two-wheeled vehicle having a frame,
   a retractable vehicle standard and a seating area for the vehicle operator, a pair of substantially identical manually engageable handles located at the opposite sides of the vehicle frame at positions adapted to be manually grasped by the vehicle operator for elevating the vehicle and thereby facilitating placing the vehicle on the standard, first and second mounting bracket means for supporting said handles for pivotal movement between a first generally vertically projecting position arranged generally parallel to said frame and a second generally horizontal position extending laterally outwardly from said frame, means cooperable with said handle for preventing said handle from pivoting beyond one of said positions, said mounting brackets being generally U-shaped and each comprising a central section fixedly secured to said frame and spaced parallel side portions, a foot pedal member connected by a pivot pin to each of said mounting brackets, with said pivot pins extending through said side portions of the associated of said brackets and the adjacent end of the associated foot pedal member, said handles being mounted on the outer ends of said foot pedal members and including a gripping portion extending generally tranvesely of the associated pedal member, said handle extending upwardly from said mounting bracket when in said first position and extending generally horizontally outwardly from said mounting bracket when in said second position.

* * * * *